(12) United States Patent
Ito

(10) Patent No.: US 12,556,641 B2
(45) Date of Patent: Feb. 17, 2026

(54) IMAGE PROCESSING APPARATUS AND IMAGE FORMING APPARATUS

(71) Applicant: Toshiba Tec Kabushiki Kaisha, Tokyo (JP)

(72) Inventor: Shinsaku Ito, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 206 days.

(21) Appl. No.: 18/353,003

(22) Filed: Jul. 14, 2023

(65) Prior Publication Data

US 2024/0031507 A1 Jan. 25, 2024

(30) Foreign Application Priority Data

Jul. 21, 2022 (JP) ................................ 2022-116001

(51) Int. Cl.
*G06F 15/00* (2006.01)
*H04N 1/00* (2006.01)
*H04N 1/04* (2006.01)
*H04N 1/387* (2006.01)

(52) U.S. Cl.
CPC ....... *H04N 1/3876* (2013.01); *H04N 1/00567* (2013.01); *H04N 1/0057* (2013.01); *H04N 1/00766* (2013.01); *H04N 1/04* (2013.01)

(58) Field of Classification Search
None
See application file for complete search history.

(56) References Cited

U.S. PATENT DOCUMENTS

| 5,247,371 | A | 9/1993 | Hikawa | |
| 6,333,774 | B1 * | 12/2001 | Ito | B41J 3/60 |
| | | | | 355/24 |
| 9,908,353 | B2 | 3/2018 | Nakahara | |
| 11,323,589 | B2 | 5/2022 | Hiroe | |

(Continued)

FOREIGN PATENT DOCUMENTS

| JP | H01220962 A | 9/1989 |
| JP | H02231694 A | 9/1990 |
| JP | H0535938 A | 2/1993 |

(Continued)

OTHER PUBLICATIONS

Japanese Office Action dated Oct. 30, 2025, mailed in counterpart Japanese Application No. 2022-116001, 6 pages.

*Primary Examiner* — Mark R Milia
(74) *Attorney, Agent, or Firm* — Kim & Stewart LLP

(57) ABSTRACT

According to one embodiment, an image processing apparatus has a storage unit and a scanner to read an image from a sheet, generate image data by the reading of the image from the sheet, and store the image data in the storage unit. A control unit combines a reading-direction image indicating a reading direction of the scanner with the generated image data to produce combined image data, and then stores the combined image data in the storage unit, The control unit is configured to set a position where the reading-direction image is arranged in the combined image data and a size of the reading-direction image based on a reading resolution in the reading of the image from the sheet by the scanner and a recording resolution of the image data recorded in the storage unit.

20 Claims, 16 Drawing Sheets

(56) References Cited

U.S. PATENT DOCUMENTS

2023/0266702 A1* 8/2023 Hiroe ................ H04N 1/00063
                                                            358/474

FOREIGN PATENT DOCUMENTS

| JP | H0969934 A | 3/1997 |
| JP | 2017170807 A | 9/2017 |
| JP | 2017170808 A | 9/2017 |
| JP | 2022007247 A | 1/2022 |

* cited by examiner

FIG. 14

^Scanning Direction ; Error Code = XXXX
Full Color Copy ; Text mode ; Darkness Adjustment +1;

IMAGE PROCESSING APPARATUS AND IMAGE FORMING APPARATUS

CROSS-REFERENCE TO RELATED APPLICATION

This application is based upon and claims the benefit of priority from Japanese Patent Application No. 2022-116001, filed Jul. 21, 2022, the entire contents of which are incorporated herein by reference.

FIELD

Embodiments described herein relate generally to an image processing apparatus and an image forming apparatus.

BACKGROUND

In investigation of defects in a scanned image, the reading direction of a document is important information. In investigation of defects in a printed image, the image forming direction on a sheet is important information. If information such as the reading direction and the image forming direction is lacking, there is a risk that investigation of defects will require a lot of time and effort.

BRIEF DESCRIPTION OF THE DRAWINGS

FIG. 14 is a diagram illustrating an example of a letter pattern.

DETAILED DESCRIPTION

The present disclosure provides an image processing apparatus and an image forming apparatus for which a conveying direction or orientation of a sheet can be easily identified.

In general, according to one embodiment, an image processing apparatus includes a storage unit, a scanner, and a control unit. The scanner is configured to read an image from a sheet, generate image data by the reading of the image from the sheet, and store the image data in the storage unit. The control unit is configured to combine a reading-direction image indicating a reading direction of the image from sheet by the scanner with the generated image data from the scanner to produce combined image data including the reading-direction image and the image data, and store the combined image data in the storage unit. The control unit is further configured to set a position where the reading-direction image is arranged in the combined image data and a size of the reading-direction image in the combined image data based on a reading resolution in the reading of the image from the sheet by the scanner and a recording resolution of the image data recorded in the storage unit.

According to an image forming apparatus of an embodiment, it is possible to provide an image forming apparatus capable of easily specifying a reading direction or an image forming direction.

Figure 1:
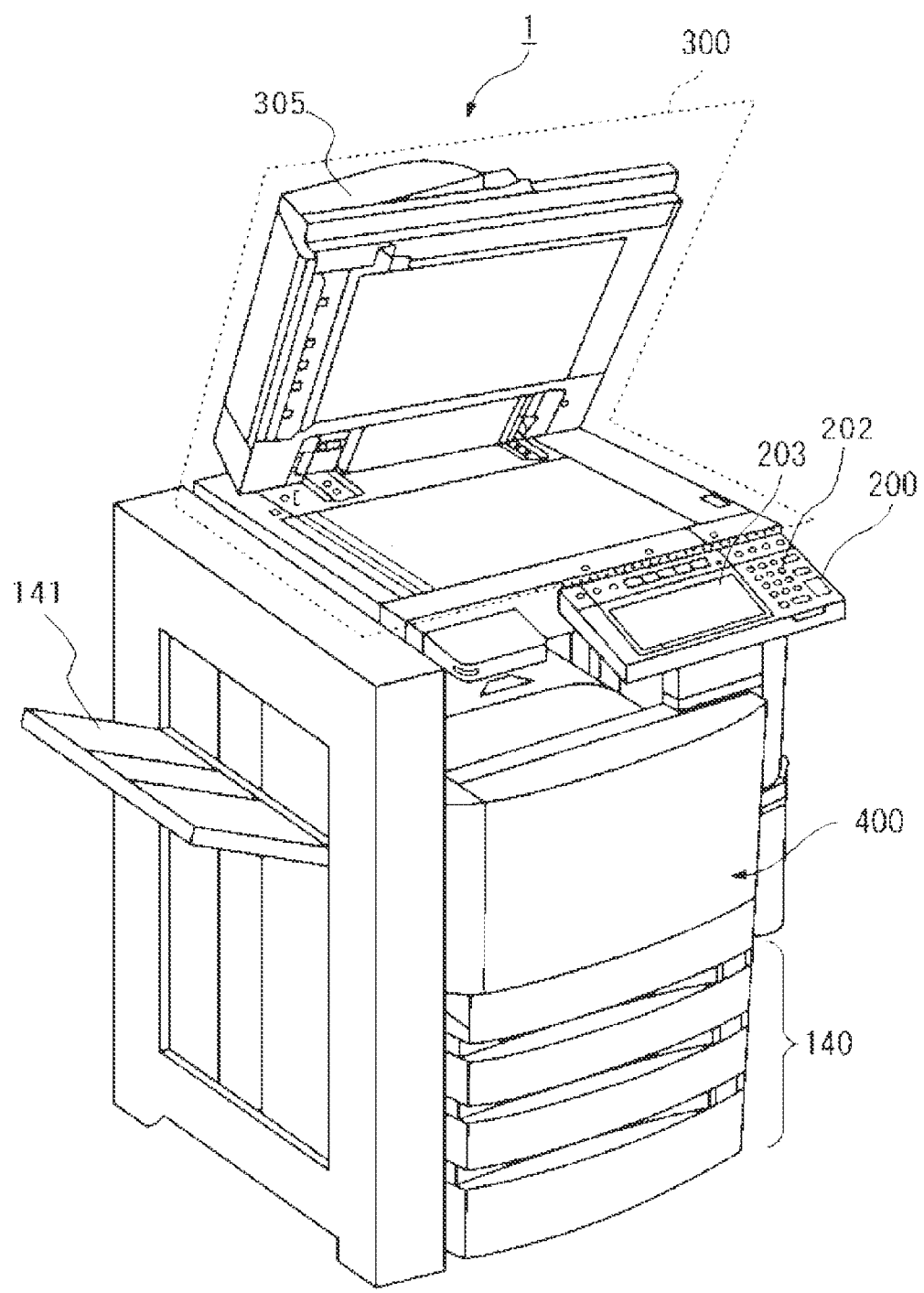
FIG. 1 is an external view of an image forming apparatus according to an embodiment.
Figure 2:
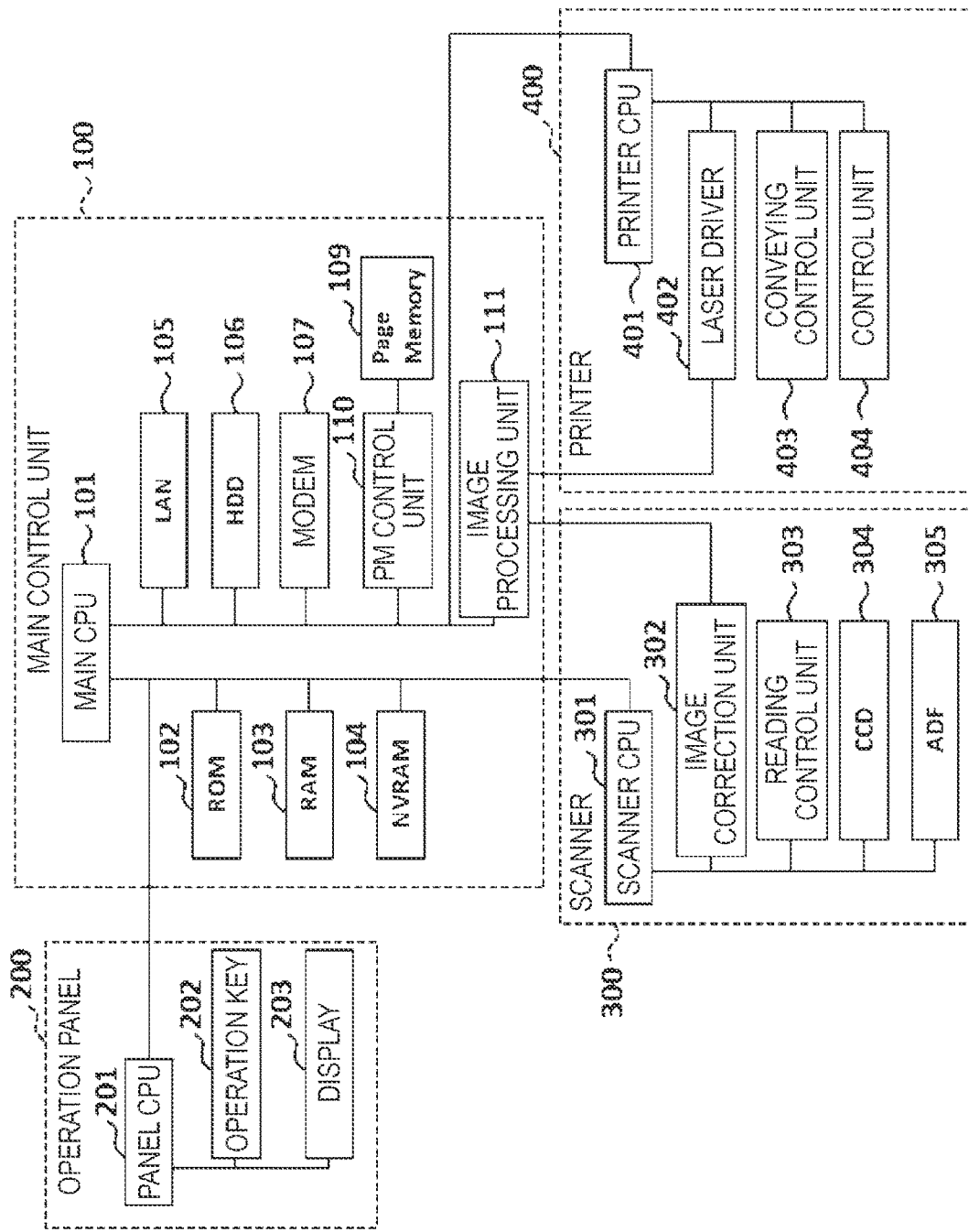
FIG. 2 is a hardware block diagram of an image forming apparatus.

FIG. 1 is an external view illustrating an example of an overall configuration of an image forming apparatus 1 according to an embodiment. FIG. 2 is a hardware block diagram illustrating a hardware configuration of the image forming apparatus 1 according to the embodiment. The image forming apparatus 1 depicted in FIG. 1 is a multi-function machine (e.g., a multifunctional peripheral device or a MFP). The image forming apparatus 1 includes a main control unit 100, a sheet containing unit 140, an operation panel 200, a scanner 300, and a printer 400. The image forming apparatus 1 prints an image on a sheet by using a developer. The developer is, for example, toner. In the following description, the developer will be described as toner. The sheet is, for example, a sheet of paper or label paper. In general, any sheet may be used as long as the image forming apparatus 1 can form an image on the surface of the sheet.

The operation panel 200 includes one or a plurality of operation keys 202 and a display 203. The operation panel 200 accepts input operations from a user. The operation panel 200 outputs a signal to the main control unit 100 according to the operation(s) performed by the user.

The display 203 is an image display device such as a liquid crystal display or an organic EL (electro luminescence) display. The display 203 displays various information about the image forming apparatus 1 and operations thereof.

The printer 400 forms an image on the sheet based on image data generated by the scanner 300 or image data received via a network. The printer 400 forms an image by using toner. The sheet on which the image is formed may be a sheet initially stored in the sheet containing unit 140 or may be a sheet fed via a manual feed tray 141. In the following description, forming the image is also expressed as printing the image.

The sheets used for image formation in the printer 400 can be contained in the sheet containing unit 140. The sheets used for image formation in the printer 400 can also be placed on the manual feed tray 141.

The scanner 300 reads an image of a read target based on brightness and darkness of reflected light. The scanner 300 records the read image data. The recorded image data may be transmitted to another information processing apparatus via the network. The image indicated by the recorded image data may be formed on a sheet by the printer 400.

As depicted in FIG. 2, the image forming apparatus 1 includes the main control unit 100, the operation panel 200, the scanner 300, and the printer 400. The image forming apparatus 1 includes a main CPU 101 in the main control unit 100, a panel CPU 201 in the operation panel 200, a scanner CPU 301 in the scanner 300, and a printer CPU 401 in the printer 400.

The main control unit 100 includes a main CPU 101, a ROM 102, a RAM 103, an NVRAM 104, a network controller 105, an HDD 106 (hard disk drive), a modem 107, a page memory 109, a PM (page memory) control unit 110, and an image processing unit 111.

The main CPU 101 controls the overall operation of image forming apparatus 1. The ROM 102 stores data necessary for control, a control program, and the like. The RAM 103 temporarily stores data. The NVRAM 104 is a non-volatile memory. For example, error codes are stored in the NVRAM 104.

The network controller 105 connects the image forming apparatus 1 and the network. The image forming apparatus 1 communicates with an external device such as a server or a personal computer (PC) via the network controller 105. The HDD 106 stores data such as images used for image formation and images read by the scanner 300. The HDD 106 is an example of a storage unit. Among the image data stored in the HDD 106, a header of the image data read by the scanner 300 includes information indicating a reading resolution at the time of reading and a recording resolution recorded in the HDD 106. The modem 107 connects the image forming apparatus 1 and a telephone line.

The page memory 109 stores a plurality of pages of the image data, page by page. The page memory control unit 110 controls the page memory 109. The image processing unit 111 performs image processing on the image data. As specific examples of the image processing, color conversion processing, range correction processing, sharpness adjustment processing, gamma correction/halftone processing, and pulse width modulation processing (PWM) are exemplified. In some examples, image processing unit 111 may be implemented by using hardware such as an application specific integrated circuit (ASIC) or may be implemented by using software.

The operation panel 200 includes a panel CPU 201, operation keys 202, and a display 203. The Panel CPU 201 controls the operation panel 200. The panel CPU 201 is connected to the main CPU 101 via a bus. When the panel CPU 201 receives a display instruction from the main CPU 101, the panel CPU 201 controls a screen of the display 203 according to the received instruction. If the panel CPU 201 receives numerical values, processes of an execution target, and setting information from the operation keys 202, the panel CPU 201 outputs data indicating the numerical values, the processes of the execution target, and the setting information to the main CPU 101. The operation key 202 is an input device for making selections of operations to be executed, changes to setting information, entry of numerical values, and the like. As specific examples of information received by the operation keys 202, various instructions and settings such as a type (size and orientation) of a sheet on which an image is to be formed, a magnification of image formation, and image quality adjustment can be performed. The display 203 is a display device such as a liquid crystal display or an organic EL display. The display 203 may be configured as a touch panel.

A document mode, a color mode, and an image quality adjustment and the like can be set from the operation panel 200 as well as selections of functions of a copier, a printer, a scanner, and a facsimile machine. The document mode can be a set of preset values such as toner consumption, image density, color balance, background density, sharpness, noise reduction amount, and other various values. As the document mode, a letter mode, a photograph mode, a letter-photograph mode, and the like are exemplified. The letter mode is a mode suitable for letter-type documents. The photograph mode is the mode suitable for photographs. The letter-photograph mode is suitable for documents containing both letters and photographs (high quality images). As the color modes, a full-color mode, a two-color mode, a monochromatic color mode, and a black mode are exemplified. In the full-color mode, colors of yellow (Y), magenta (M), cyan (C), and black (K) are used. In the two-color mode, two colors are used. In the monochromatic color mode, a single color is used. In the black mode, just black (K) is used. As the image quality adjustment, gamma correction and density correction are exemplified. The gamma correction can correct gradation reproduction of yellow (Y), magenta (M), cyan (C), and black (K). The density correction can correct a density of an image. For the density correction, a default value is 128, and an allowable value can be set between 0 and 255. As the value gets higher, the image density is increased.

The scanner 300 includes a scanner CPU 301, an image correction unit 302, a reading control unit 303, a charge coupled device (CCD) 304, and an auto document feeder (ADF) 305. The scanner CPU 301 controls the scanner 300. The image correction unit 302 has, for example, an A/D conversion circuit (analog/digital conversion circuit), a shading correction circuit, and a line memory. The A/D conversion circuit converts R, G, and B analog signals output from the CCD 304 into digital signals. The ADF 305 is an automatic document feeder. The ADF 305 takes in a sheet placed by the user thereon into a conveyance path in the conveying direction according to a placed orientation. The ADF 305 conveys the sheet by rotating a conveying roller on the conveyance path, and the CCD 304 reads the image from the conveyed sheet.

The printer 400 includes a printer CPU 401, a laser driver 402, a conveying control unit 403, and a control unit 404. The printer CPU 401 controls the printer 400. The laser driver 402 drives a laser to form an electrostatic latent image on a photoreceptor. The conveying control unit 403 conveys the sheet on which the image is to be formed. The control unit 404 forms the image on the sheet conveyed by the conveying control unit 403 by controlling the devices such as the laser driver 402.

Figure 3:
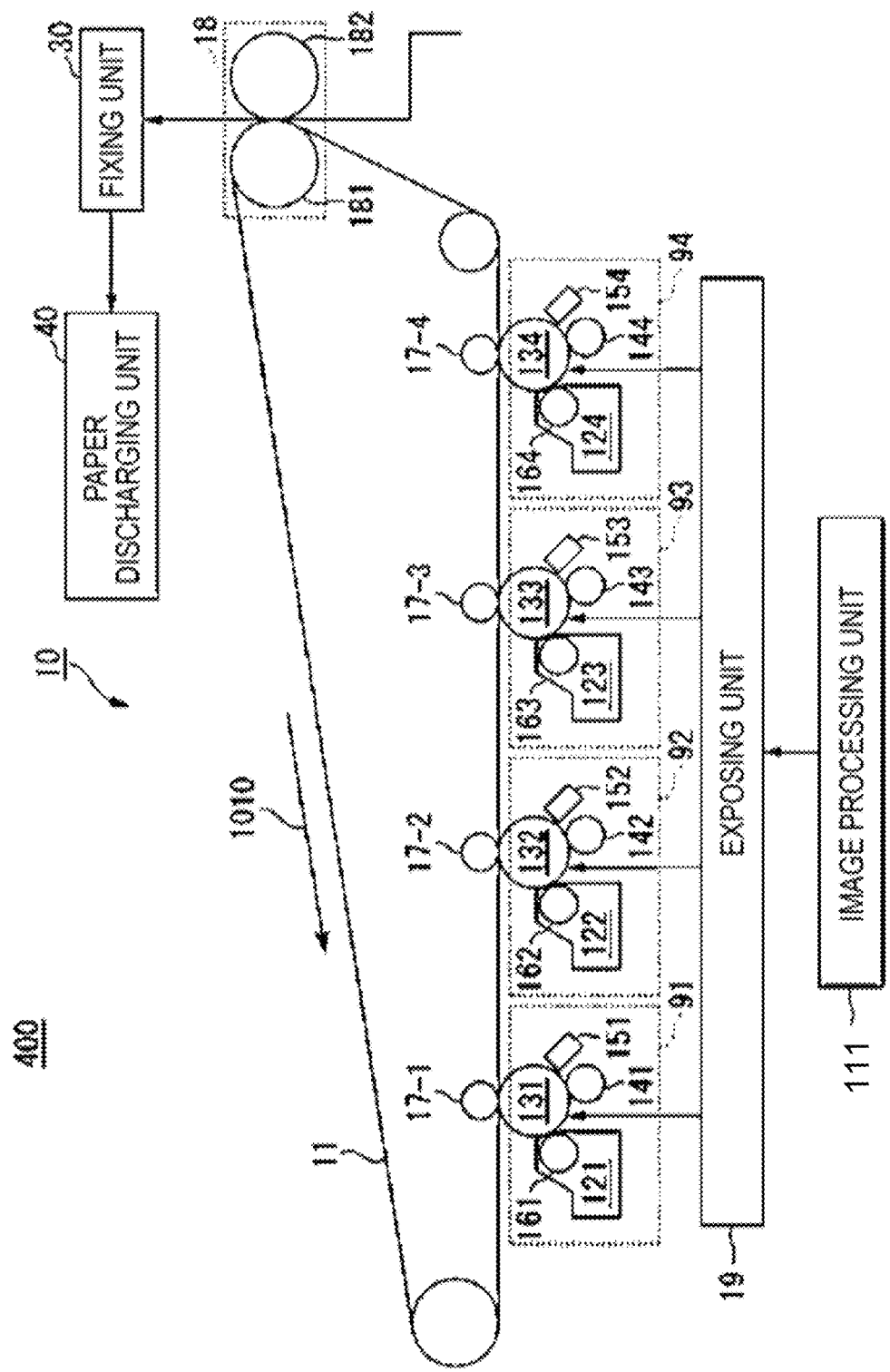
FIG. 3 is a diagram illustrating an example of an internal configuration of a printer.

FIG. 3 is a diagram illustrating an example of an internal configuration of the printer 400. In the example of FIG. 3, the printer 400 is a quadruple tandem printer. However, the printer 400 need not be limited to the quadruple tandem printer.

The printer 400 includes an image forming unit 10, a fixing unit 30, and a paper discharging unit 40. The image forming unit 10 includes an intermediate transfer member 11, developing devices 91 to 94, a plurality of primary transfer rollers 17 (17-1, 17-2, 17-3, 17-4), a secondary transfer unit 18, and an exposing unit 19.

The intermediate transfer member 11 may be configured by using, for example, an endless belt. The intermediate transfer member 11 is rotated in a direction of an arrow 1010 by a roller. In this embodiment, upstream and downstream are defined based on a direction in which the intermediate transfer member 11 moves. A visible image generated by the developing devices 91, 92, 93, 94 is transferred to a surface of the intermediate transfer member 11.

The developing devices 91 to 94 form visible images by using toners having different properties. For example, different color toners may be used. As the toners having different colors, toner of colors of yellow (Y), magenta (M), cyan (C), and black (K) may be used. In some developing devices, toners that fade with an external stimulus (for example, heat) may be used. In some developing devices, special toners such as glossy toners and fluorescent toners may be used.

In FIG. 3, the developing device 91 is positioned most upstream among the four developing devices, and the developing device 94 is positioned most downstream among the four developing devices.

The developing devices 91 to 94 differ in the properties of the toner used, but have the same configuration. The developing device 91 includes a developing unit 121, a photosensitive drum 131, a charger 141, a cleaning blade 151, and a developing drum 161. The developing device 92 includes a developing unit 122, a photosensitive drum 132, a charger 142, a cleaning blade 152, and a developing drum 162. The developing device 93 includes a developing unit 123, a photosensitive drum 133, a charger 143, a cleaning blade 153, and a developing drum 163. The developing device 94 includes a developing unit 124, a photosensitive drum 134, a charger 144, a cleaning blade 154, and a developing drum 164.

In the following description, the developing unit 121, the developing unit 122, the developing unit 123, and the developing unit 124 are referred to as a developing unit 12 if the developing units 121, 122, 123, and 124 are not being distinguished from each other. The same applies to a photosensitive drum 13 (131, 132, 133, 134), a charger 14 (141, 142, 143, 144), a cleaning blade 15 (151, 152, 153, 154), and a developing drum 16 (161, 162, 163, 164).

Hereinafter, these developing devices 91 to 94 will be described by using the developing device 91 as an example. The developing device 91 includes the developing unit 121, the photosensitive drum 131, the charger 141, the cleaning blade 151, and the developing drum 161. The developing unit 121 contains toner and carriers. The developing unit 121 allows the toner to adhere to the photosensitive drum 131 by means of the developing drum 161.

The photosensitive drum 131 has the photoreceptor (photosensitive region) on an outer peripheral surface of the photosensitive drum. The photoreceptor is, for example, an organic photoconductor (OPC). The photosensitive drum 131 is exposed by the exposing unit 19, and the electrostatic latent image is formed on a surface of the photosensitive drum.

The charger 141 uniformly charges the surface of the photosensitive drum 131.

The cleaning blade 151 is, for example, a plate-like member. The cleaning blade 151 is made of rubber such as urethane resin. The cleaning blade 151 removes the toner still adhering to the photosensitive drum 131.

Next, the outline of operations of the developing device 91 will be described. The photosensitive drum 131 is charged to a predetermined potential by the charger 141. Next, the exposing unit 19 irradiates the photosensitive drum 131 with light. Accordingly, the potential of the region irradiated with the light on the photosensitive drum 131 changes. Due to this change, the electrostatic latent image is formed on the surface of the photosensitive drum 131. The electrostatic latent image on the surface of photosensitive drum 131 is developed with the toner in the developing unit 121. That is, the visible image, which is an image developed with the toner, is formed on the surface of the photosensitive drum 131.

The primary transfer rollers 17 (17-1 to 17-4) transfer the visible images formed on the photosensitive drums by the respective developing devices 91 to 94 to the intermediate transfer member 11.

The secondary transfer unit 18 includes a secondary transfer roller 181 and a secondary transfer counter roller 182. The secondary transfer unit 18 collectively transfers the visible image formed on the intermediate transfer member 11 to the sheet which is a target of image formation. Transfer by the secondary transfer unit 18 is achieved by, for example, a potential (voltage) difference between the secondary transfer roller 181 and the secondary transfer counter roller 182.

The exposing unit 19 forms the electrostatic latent image by irradiating the photosensitive drums of the developing devices 91 to 94 with light. The exposing unit 19 has a light source such as a laser or a light emitting diode (LED). In this embodiment, the exposing unit 19 includes a laser, which operates under the control of the laser driver 402.

The fixing unit 30 fixes the visible image onto the sheet by applying heat and pressure to the visible image transferred to the sheet. The paper discharging unit 40 discharges the sheet on which the visible image is fixed by the fixing unit 30 to the outside of the image forming apparatus 1.

Next, a reading-direction image indicating a reading direction for a sheet and an image-forming-direction image indicating an image forming direction for sheet will be described. The reading-direction image and the image-forming-direction image are for permitting the reading direction and the image forming direction to be easily identified by a service person who performs maintenance and inspection on the image forming apparatus 1. Once the reading direction or the image forming direction is specified, the time and effort required to investigate defects of the image forming apparatus can be greatly reduced as compared to the case where the reading direction or image forming direction cannot be specified.

First, the reading-direction image will be described. The reading-direction image is an image indicating the reading direction of the scanner 300. The reading-direction image may be, for example, an image indicating the reading direction of the scanner 300 according to the position of the reading-direction image on the sheet. When scanning the document, the image forming apparatus 1 combines the reading-direction image indicating the reading direction of the scanner 300 with the image data. Specifically, the details are as follows. The image processing unit 111 of the main control unit 100 combines a reading-direction image with image data generated by scanning. The image processing unit 111 records the image data combined with the reading-direction image in the HDD 106.

In this context, the reading direction of the scanner 300 is the sub-scanning direction of a line sensor and is the direction from the side last read by the line sensor to the side first read among the four sides of the document.

Figure 4:
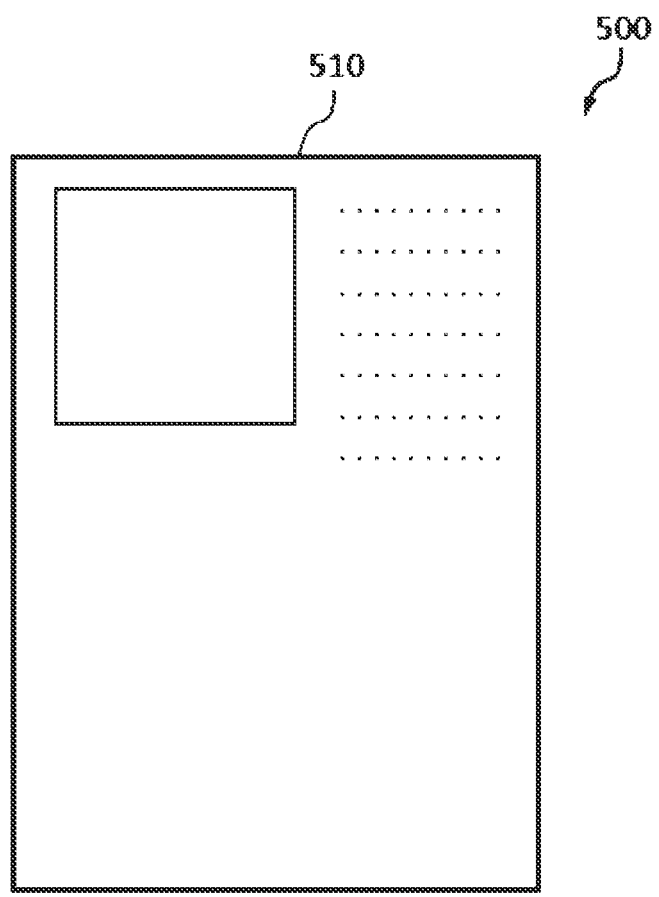
FIG. 4 is a diagram illustrating an example of a document.

Therefore, the reading direction is uniquely determined, for example, if just the side where reading is started is known. Therefore, the reading-direction image in this embodiment is an image that identifies the side of the document on which reading is started by the line sensor among the four sides of the document. FIG. 4 is a diagram illustrating an example of a document. A document 500 is illustrated in FIG. 4. Of the four sides of the document 500, the side read first by the scanner 300 is denoted by reference numeral 510 (first read side 510).

Figure 5:
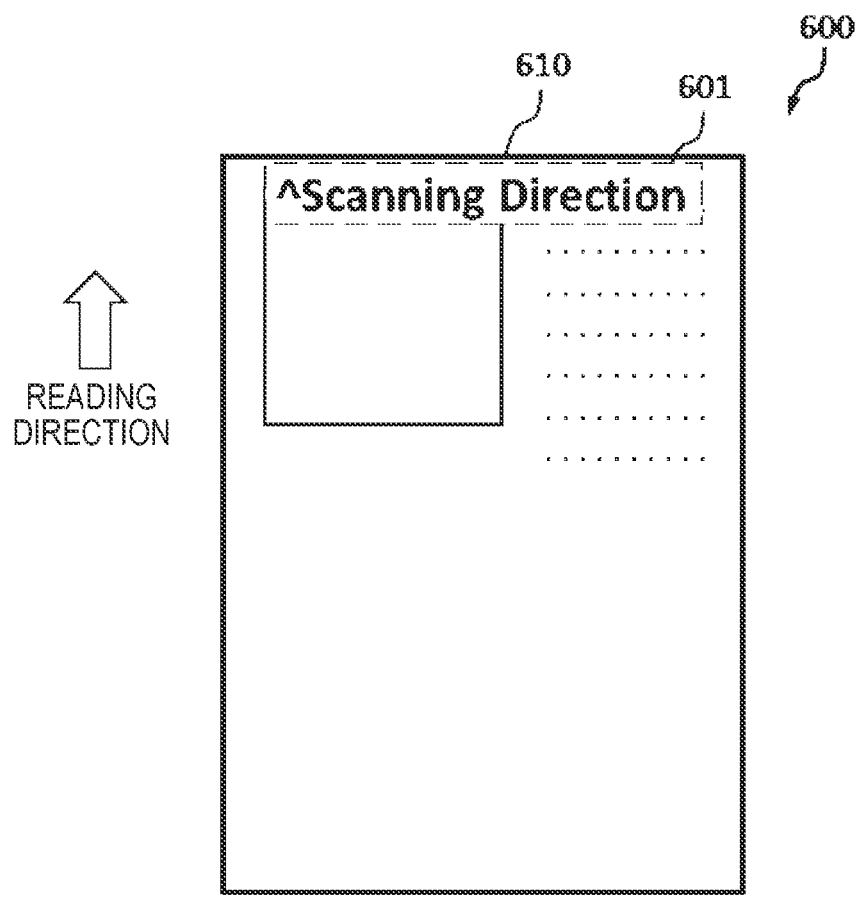
FIG. 5 is a diagram illustrating combined image data in which reading-direction images are combined.

FIG. 5 is a diagram illustrating combined image data. A reading-direction image 601 is included in combined image data 600. The reading-direction image is a letter pattern configured so that letters and letter strings make sense in a natural language or otherwise by using letter information. The letter information includes characters and letters. The reading-direction image is configured with letters and letter strings the meaning of which can be ascertained by the service person. The letter information is stored, for example, in the RAM 103. The letter information may include pictographs. For the purpose of facilitating identification of the letters and the letter strings, the reading-direction image may use lines (solid lines, dashed lines, dotted lines, or the like) or may color regions surrounding the letters and letter strings. In the example of FIG. 5, text "^Scanning Direction", which is a reading-direction image 601, is arranged in the direction perpendicular to the reading direction. As long as the reading direction can be determined, the specific shape and configuration of the reading-direction image need not be limited. In the combined image data 600, a side 610 corresponds to the side 510 of the document 500. This side 610 is specified by the contents of the reading-direction image 601. For example, in the example of FIG. 5, the side 610 is specified by "^" (a directional character) in the text/image "^Scanning Direction". Accordingly, the reading direction is easily specified.

In addition, the side 610 may be identified by the letter-forming direction. Herein, a letter-forming direction will be described. The letter-forming direction is a direction in which the letter image can be normally read as a letter. For example, if a letter image of "H" is arranged along the letter-forming direction (text direction), the letter image of "H" can be recognized as a letter "H", but if the letter image was tilted by 90 degrees from the letter-forming direction, in some cases, the letter image of "H" might appear similar to a letter "I" instead of "H". In addition, if a letter image of "m" is arranged along the letter-forming direction, the letter image of "m" can be recognized as a letter "m", but if the letter image is tilted by 180 degrees from the letter-forming direction, in some cases, the letter image of "m" may be recognized as a letter "w" instead of "m". In the example of FIG. 5, the side 610 is specified as the side above the letter-forming direction of the letters of "^Scanning Direction". Accordingly, the reading direction is easily specified.

The image data may be recorded in the HDD 106 at a resolution different from the resolution at which the document is read. For example, the resolution of the image data recorded in the HDD 106 may be 300 dpi even though the resolution at the time of document reading was 600 dpi. At this time, if the reading-direction image is combined as it is, a portion of the reading-direction image may be cropped/omitted.

Figure 6:
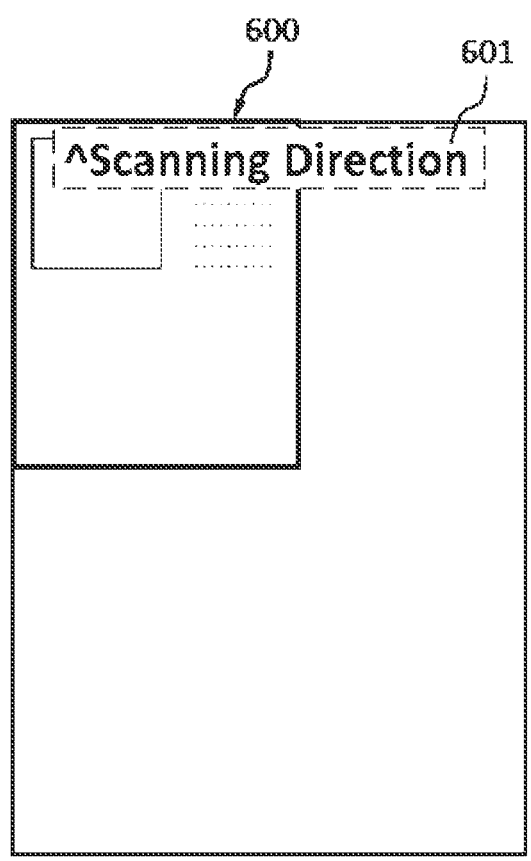
FIG. 6 is a diagram illustrating an example of in which a part of a reading-direction image is omitted.

FIG. 6 is a diagram illustrating an example of a problem in which a part of the reading-direction image is outside the image boundary. Since the resolution becomes smaller, the image data recorded in the HDD 106 also becomes a smaller image. Therefore, as illustrated in FIG. 6, the left side of "^Scanning Direction", which is the reading-direction image 601, is combined, but the right side of "^Scanning Direction" is not combined and is omitted from the printed sheet.

Therefore, the image processing unit 111 determines the position where the reading-direction image should be arranged and the size of the reading-direction image based on the reading resolution and the recording resolution so that no portion of the reading-direction image is omitted. Correction of the combination position and correction of the size of the reading-direction image are collectively referred to as a reading-direction image correction process. An example of the reading-direction image correction process will be described.

The coordinates of the combination position of the reading-direction image if the reading resolution and the recording resolution are the same are denoted by (XPOS1, YPOS1) and (XPOS2, YPOS2), respectively. The reading resolution is denoted by IN_DPI, and the recording resolution is denoted by OUT_DPI. The correction coefficient K is denoted by OUT_DPI/IN_DPI. The horizontal and vertical lengths of the reading-direction image if the reading resolution and the recording resolution are the same are denoted by XSIZE and YSIZE, respectively.

At this time, the image processing unit 111 derives (K×XPOS1, K×YPOS1) and (K×XPOS2, K×YPOS2) as the coordinates of the corrected combination position. The image processing unit 111 derives K×XSIZE and K×YSIZE respectively as corrected lengths in the horizontal direction and vertical direction of the reading-direction image as coordinates of the corrected combination position. For example, if the IN_DPI is 600 dpi and the OUT_DPI is 300 dpi, the correction coefficient is 0.5, so that the reading-direction image becomes a symbol of which length and width are halved.

Figure 7:
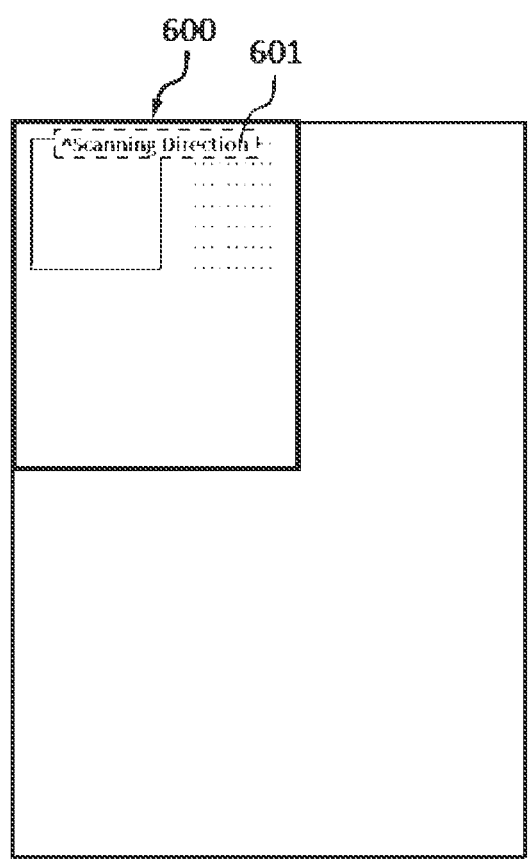
FIG. 7 is a diagram illustrating an example of combination after correction.

FIG. 7 is a diagram illustrating an example of combination after correction. As illustrated in FIG. 7, the reading-direction image 601 with no portion "^Scanning Direction" text being omitted, and the size is also corrected. By doing so, the reading direction can be specified even if the reading resolution and the recording resolution are different. When the image data is printed, since the image data is printed after returning to the reading resolution, the size of the reading-direction image can be restored to the original size, so that the reading-direction image can be maintained at a constant size.

Next, the reading-direction image at the time of copying will be described. In copying, the document is read first, and then magnification-changed (enlarged or reduced) according to the designated magnification, and printed on a sheet of the designated size. If the position and size of the reading-direction image change according to a magnification change, there is a possibility that the service person cannot determine whether the image printed on the sheet is the original image on the document or the reading-direction image. Whether or not to change the magnification and the changing magnification are recorded in the RAM 103. The image processing unit 111 determines whether or not to change the magnification by referring to the RAM 103.

Therefore, even if the image is magnification-changed and printed on the sheet, the image processing unit 111 combines the reading-direction image with the image data without changing the position where the reading-direction image is combined and the size of the reading-direction image.

Figure 8:
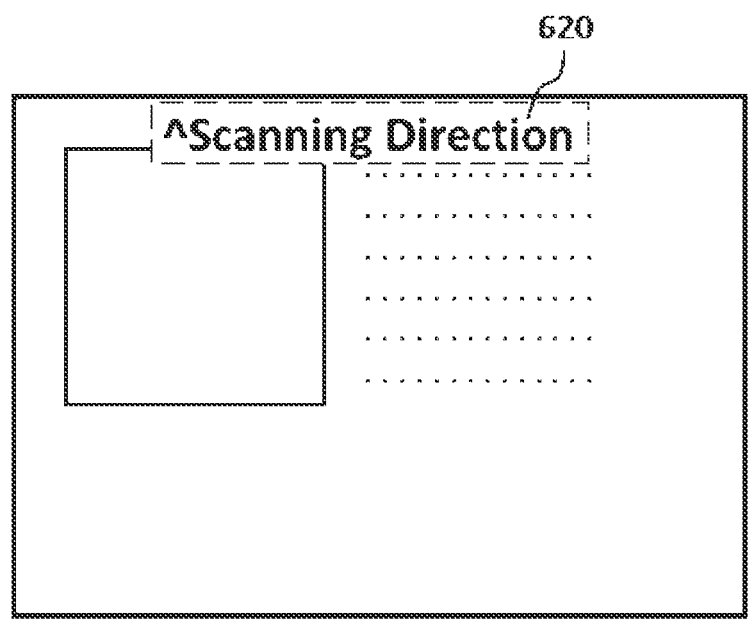
FIG. 8 is a diagram illustrating an example of a sheet on which images are printed at the same magnification.
Figure 9:
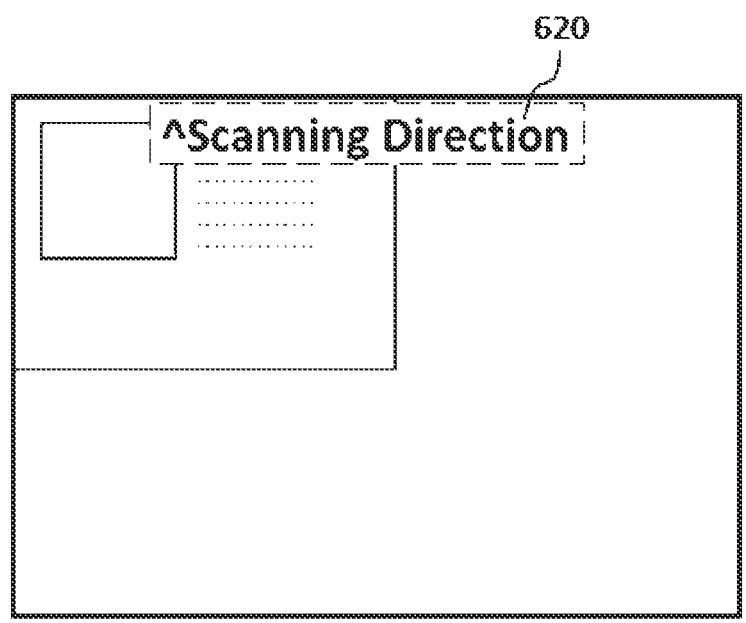
FIG. 9 is a diagram illustrating an example of a sheet on which a reduced image is printed.
Figure 10:
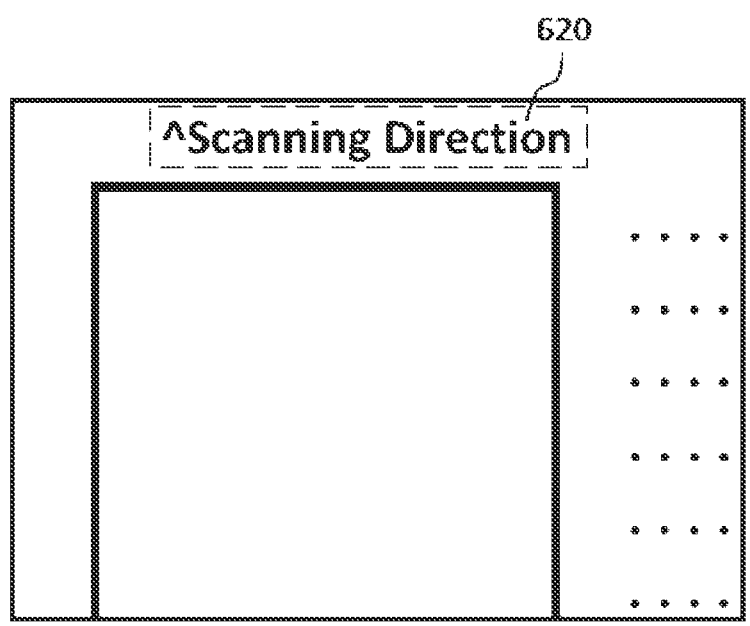
FIG. 10 is a diagram illustrating an example of a sheet on which an enlarged image is printed.

FIG. 8 is a diagram illustrating an example of a sheet on which images are printed at the same magnification. FIG. 9 is a diagram illustrating an example of a sheet on which a reduced image is printed. FIG. 10 is a diagram illustrating an example of a sheet on which an enlarged image is printed.

In FIGS. 8, 9, and 10, it is illustrated that printing is performed without a change in the position of the reading-direction image 620 and the size of the reading-direction image 620. By doing so, the service person can determine whether the image printed on the sheet is the original image on the document or the reading-direction image.

Next, combining the image-forming-direction image with image data will be described. Herein, the image forming direction is a conveying direction of the sheet passing through the secondary transfer unit 18.

Therefore, the image forming direction is uniquely determined, for example, if the side first passing through the secondary transfer unit 18 is specified. Therefore, the image-forming-direction image in this embodiment is an image specifying the side of the sheet that first passes through the secondary transfer unit 18 among the four sides of the sheet. The conveying direction of the sheet is determined by the orientation of the sheet in the sheet containing unit 140. The image processing unit 111 generates the image data by combining the image-forming-direction images according to the orientation of the sheet in the sheet containing unit 140. The orientation of the sheet is recorded in the RAM 103 for each cassette of the sheet containing unit 140. The image processing unit 111 records the combined image data in the HDD 106. The image data recorded in the HDD 106 is output to the printer 400.

Figure 11:
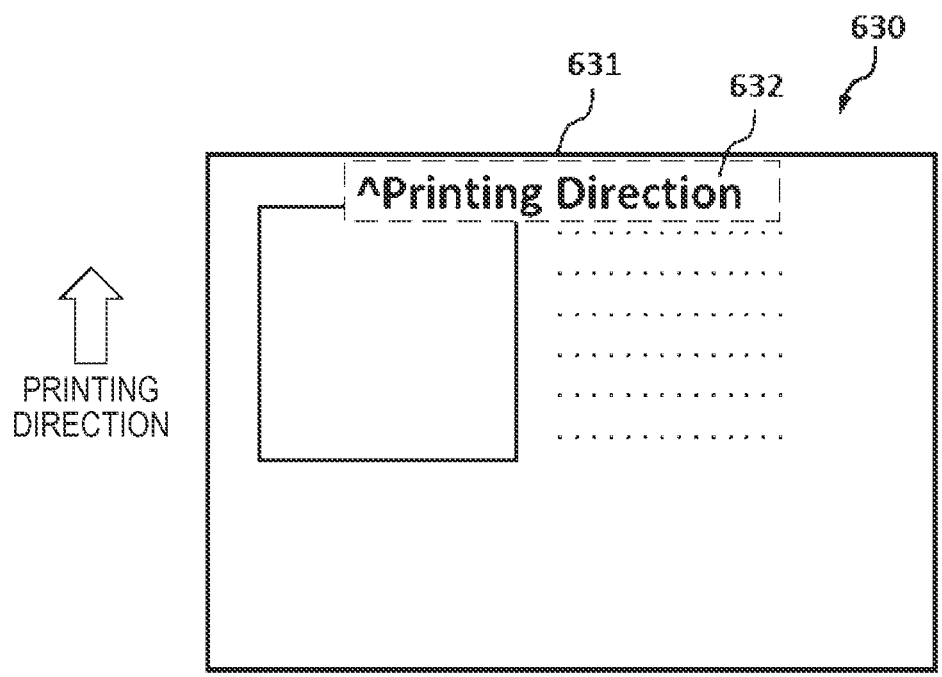
FIG. 11 is a diagram illustrating an example of a printing-completed sheet on which an image-forming-direction image is printed.

FIG. 11 is a diagram illustrating an example of a printing-completed sheet on which the image-forming-direction image has been printed. The printing-completed sheet 630 is illustrated in FIG. 11. Among the four sides of the printing-completed sheet 630, the side first passing through the secondary transfer unit 18 is a side 631. This side 631 is specified by the position and content of an image-forming-direction image 632. Accordingly, the image forming direction is easily identified.

The configuration of the image-forming-direction image 632 is similar to that of a reading-direction image already described, but the image forming direction is discernible by the content of the image-forming direction image 632. In FIG. 11, "Printing Direction" is used as the content of the image-forming-direction image 632 and the text is arranged along the direction perpendicular to the reading direction. In addition, in FIG. 11, the side 631 is specified by character "^" in image-forming-direction image 632 or by the direction along which the letters in "^Printing Direction" are formed. Accordingly, the reading direction is easily identified. The image processing unit 111 combines the image-forming-direction image(s) with the image data without changing the magnification of the image-forming-direction image even if an image with a magnification change is being printed on the sheet. Accordingly, the service person can determine whether the image printed on the sheet is the original image on the document or the image-forming-direction image.

Figure 12:
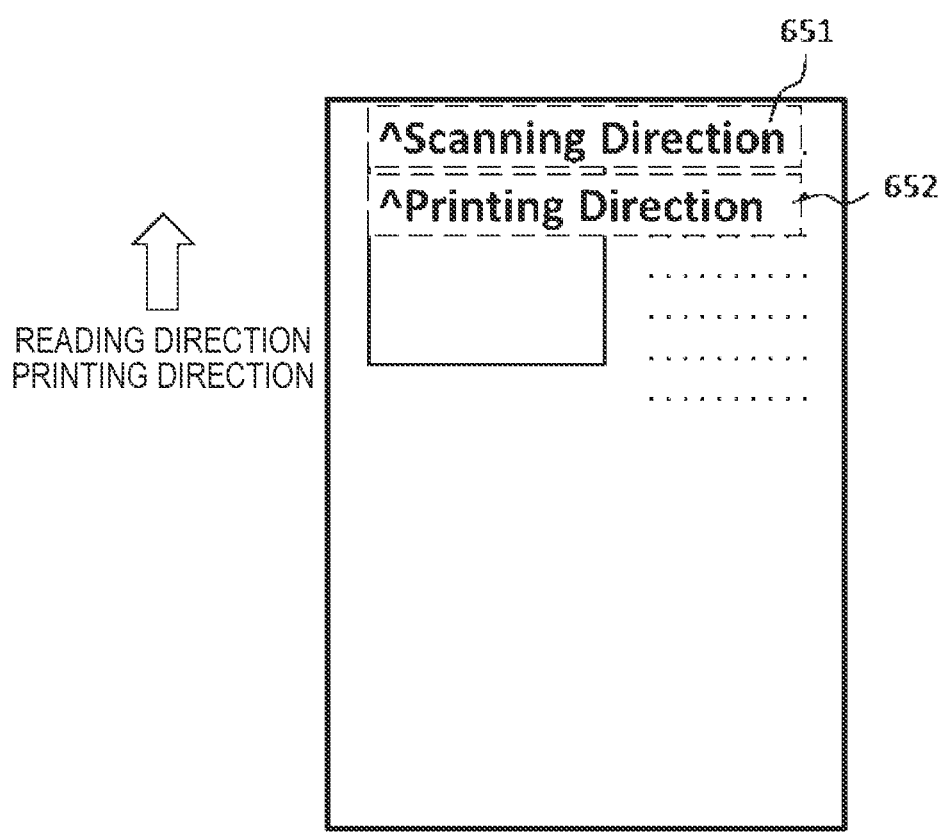
FIG. 12 is a diagram illustrating an example of a sheet on which an image-forming-direction image and a reading-direction image are printed.
Figure 13:
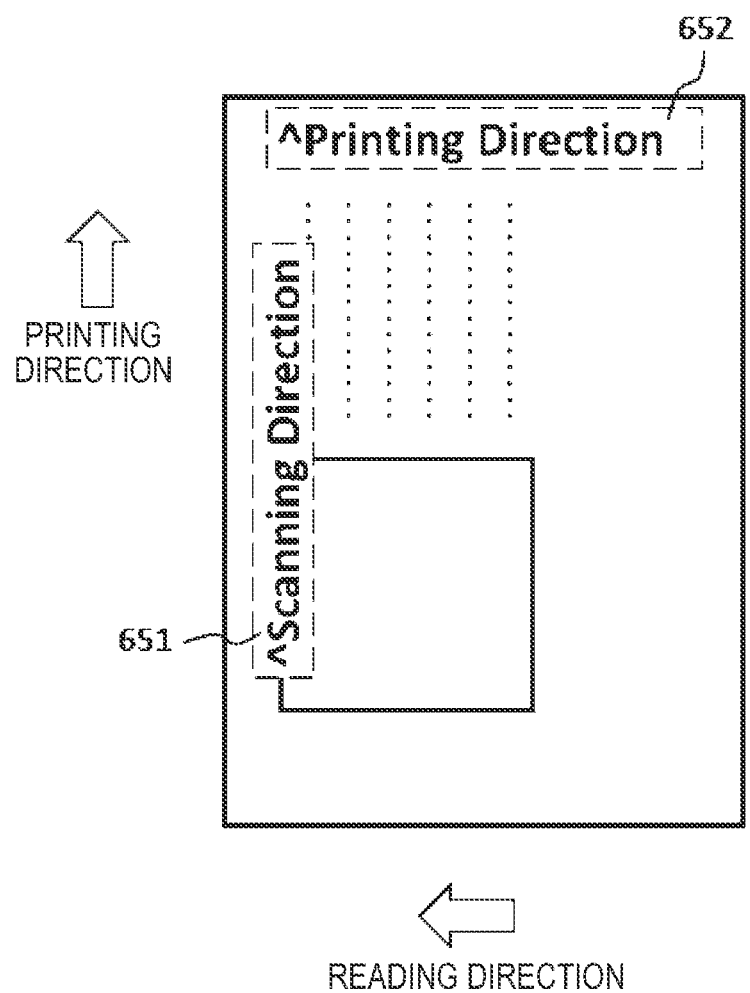
FIG. 13 is a diagram illustrating an example of a sheet on which an image-forming-direction image and a reading-direction image are printed.

The image forming apparatus 1 can also combine an image-forming-direction image and a reading-direction image and print the combined image on a sheet. FIGS. 12 and 13 are diagrams illustrating examples of a sheet on which the image-forming-direction image and the reading-direction image are both printed. In the examples illustrated in FIGS. 12 and 13, the size of the sheet is A4. In the examples illustrated in FIGS. 12 and 13, the reading direction is a forward direction of A4. The forward direction of A4 here is a direction perpendicular to the short side of A4.

In the examples illustrated in FIGS. 12 and 13, the orientations of the sheets in the sheet containing unit 140 are different by 90°. Specifically, the orientation of the sheet in the example illustrated in FIG. 12 is an orientation where the conveying direction of the sheet is the forward direction of A4. The orientation of the sheet in the example illustrated in FIG. 13 is the orientation (A4-R) in which the conveying direction of the sheet is perpendicular to the forward direction of A4.

Therefore, in the example illustrated in FIG. 12, since the reading direction and the image forming direction are the same, the reading-direction image 651 and the image-forming-direction image 652 are combined so as to indicate the same direction. On the other hand, in the example illustrated in FIG. 13, since the reading direction and the image forming direction are different directions, the reading-direction image 651 and the image-forming-direction image 652 are combined so as to indicate different directions. Since the reading direction and the printing direction can be easily identified in this manner, the time and labor required for the service person to investigate the defects can be greatly reduced.

As illustrated in FIGS. 12 and 13, the reading-direction image 651 and the image-forming-direction image 652 are combined so as not to overlap each other. For example, two patterns of combination positions of the image-forming-direction image are prepared. One of the patterns indicates a position when combining only the image-forming-direction image. The other indicates a position where the image-forming-direction image do not overlap with the reading-direction image if the reading-direction image and the image-forming-direction image are combined simultaneously. Accordingly, the image processing unit 111 can combine the reading-direction image and the image-forming-direction image so as not to overlap each other.

Next, an example of a letter pattern will be described.

FIG. 14 is a diagram illustrating an example of a letter pattern. In the example illustrated in FIG. 14, a letter pattern indicating the scanning direction, an error code number indicating the error content when an error occurs, the full color mode as a color mode at the time of copying, the letter mode as a document mode, and +1 increment of density correction as an image quality adjustment entered via the operation panel are depicted.

This allows the service person to visually determine what settings the user used to perform scanning and copying based on just the letter pattern.

Figure 15:
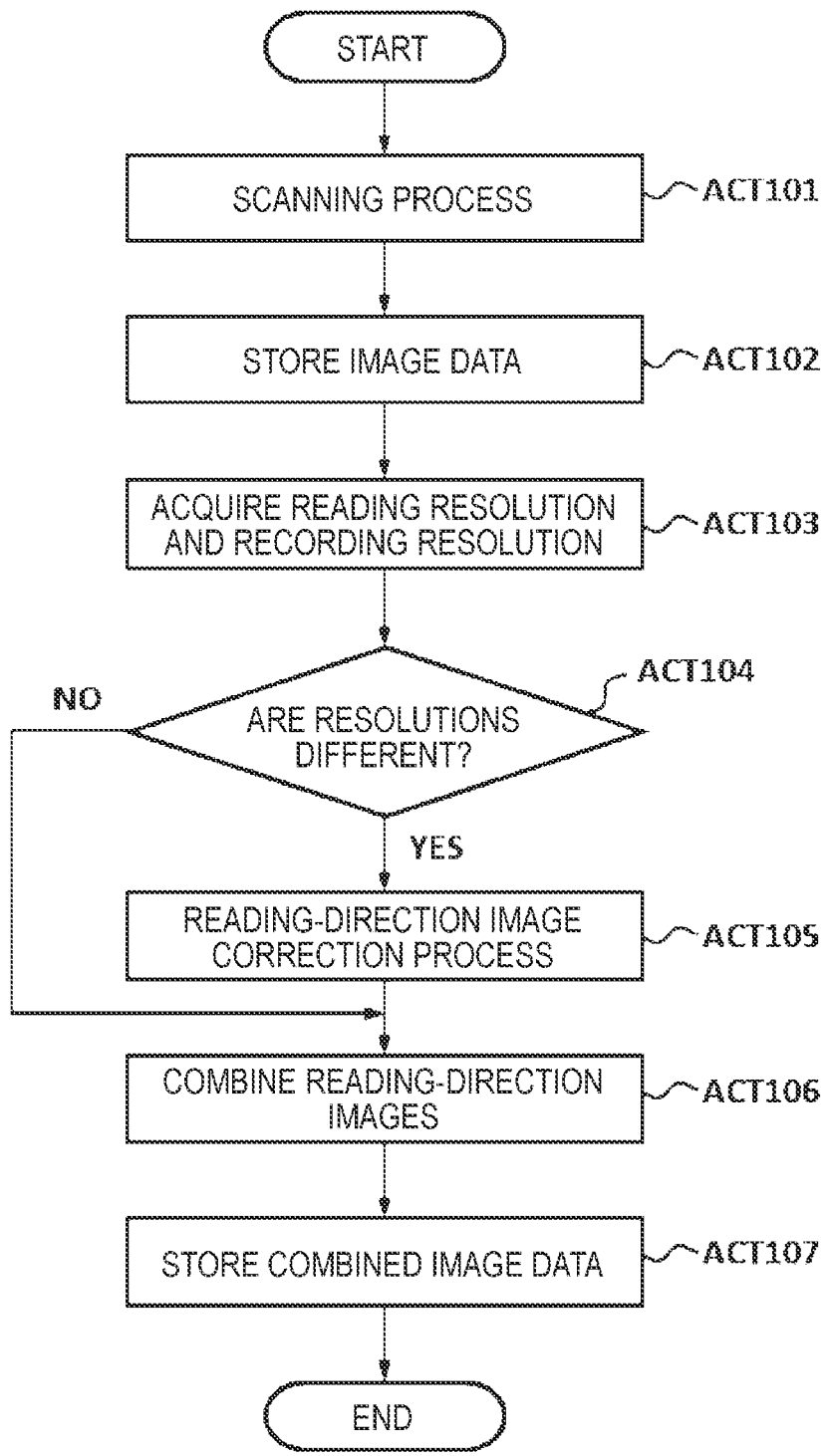
FIG. 15 is a flowchart of a process of combining reading-direction images.

FIG. 15 is a flowchart illustrating the flow of a process of combining a reading-direction image and an image-forming-direction image for copying operation. The scanner 300 performs a scanning process (ACT 101). Image data obtained by the scanning process are recorded in the page memory 109. The image processing unit 111 performs an image processing on the image data recorded in the page memory 109 and records the processed image data in the HDD 106 (ACT 102).

The image processing unit 111 acquires a reading resolution and a recording resolution from the image data recorded in the HDD 106 (ACT 103). The image processing unit 111 determines whether or not the acquired reading resolution and the acquired recording resolution are different from each other (ACT 104). If the reading resolution and the recording resolution are the same (or equivalent) (ACT 104: NO), the image processing unit 111 proceeds to ACT 106. If the reading resolution and the recording resolution are different (or not equivalent) (ACT 104: YES), the image processing unit 111 performs the reading-direction image correction process already described (ACT 105).

The image processing unit 111 combines the reading-direction image (ACT 106). When the reading-direction image correction process is performed in this context, the image processing unit 111 combines the reading-direction image at a position and a size derived by the reading-direction image correction process. If the reading resolution is equal to the recording resolution, the image processing unit 111 combines the reading-direction image at a position and a size according to the reading resolution. The image processing unit 111 records the combined image data in the HDD 106 (ACT 107), and ends the process.

Figure 16:
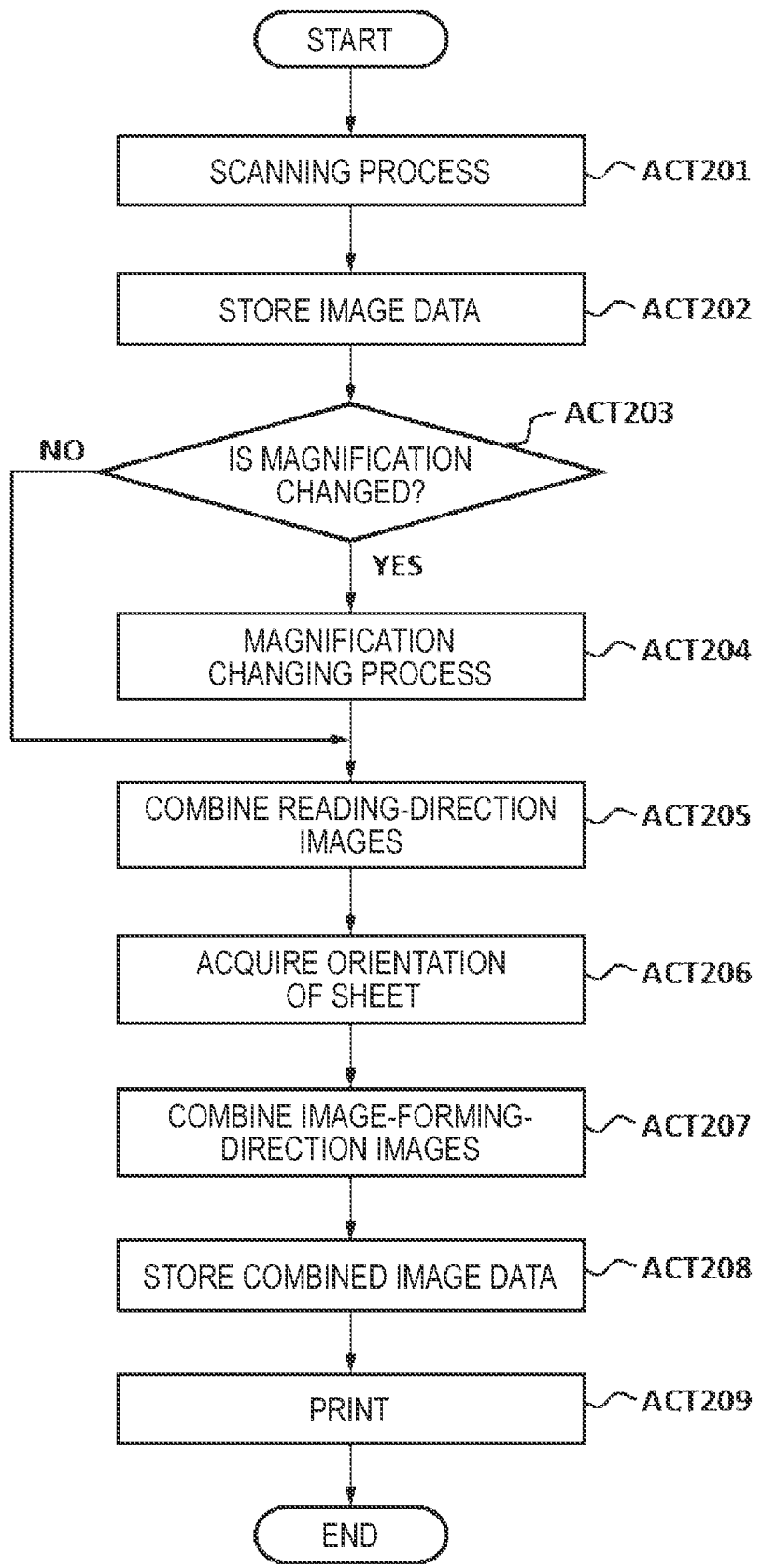
FIG. 16 is a flowchart of a process of combining a reading-direction image and an image-forming-direction image in copying.

FIG. 16 is a flowchart illustrating the flow of a process of combining the reading-direction image and the image forming direction in a copying operation. The scanner 300 performs a scanning process (ACT 201). Image data obtained by the scanning process are recorded in the page memory 109. The image processing unit 111 performs image processing on the image data recorded in the page memory 109 and records the image data in the HDD 106 (ACT 202).

The image processing unit 111 determines whether or not magnification is changed (ACT 203). If magnification is not being changed (ACT 203: NO), the process proceeds to ACT 205. If magnification is being changed (ACT 203: YES), the image processing unit 111 performs a magnification changing process (ACT 204). The magnification and the like to be changed are recorded in the RAM 103 as described above. The image processing unit 111 then combines the reading-direction image with the image data (ACT 205).

The image processing unit 111 acquires the orientation of the sheet in the sheet containing unit 140 on which the image is to be formed and also an image forming mode (ACT 206). The image processing unit 111 combines the image-forming-direction image with the image data according to the acquired orientation (ACT 207). The image processing unit 111 records the combined image data in the HDD 106 (ACT 208). The image processing unit 111 converts the image data recorded in the HDD 106 into image data (for example, raster data) for printing and outputs the image data to the printer 400. The printer 400 performs printing by using the input image data (ACT 209), and then ends the process.

In the embodiments described above, a plurality of reading-direction images for different operating or scanning modes may be provided. For example, reading-direction images of different modes may be combined so that the image data obtained from a document placed on the scanner platen glass and the image data obtained via the ADF 305 can be distinguished. Similarly, if the ADF 305 can read both sides of a document, the reading-direction images of feeding different modes may be combined so that the image data obtained from the front side of the document and the image data obtained from the back side of the document can be distinguished.

In some examples, main CPU 101 and image processing unit 111 may be implemented by the same processor. An embodiment of this type may be configured as an image processing apparatus that does not include the printer 400.

The image forming apparatus 1 of an embodiment described above, can provide means to easily identify the reading direction of a document scanner type apparatus by evaluation of an output image.

Certain functions of an image forming apparatus 1 in the above-described embodiments may be implemented by a computer executing software, firmware, or the like, program instructions. In that case, a program for implementing these functions may be recorded in a non-transitory, computer-readable recording medium, and the program recorded in this recording medium may be read into a computer system and executed. A "computer system" in this context includes hardware such as peripheral devices attached thereto as well as operating systems (OS). The term "computer-readable recording medium" refers to portable media such as flexible disks, magneto-optical disks, ROMs, and CD-ROMs and storage devices such as hard disks built into the computer system. A program may be accessed, transmitted, or downloaded via a communication network such as the Internet or a communication line such as a telephone line. The program may be used for implementing a portion of the functions described above or may be used for implementing the functions described above in combination with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
a storage unit;
a scanner configured to:
   read an image from a sheet,
   generate image data by the reading of the image from the sheet, and
   store the image data in the storage unit; and
a control unit configured to:
   combine a reading-direction image indicating a reading direction of the image from sheet by the scanner with the generated image data from the scanner to produce combined image data including the reading-direction image and the image data, and
   store the combined image data in the storage unit, wherein
the control unit is configured to set a position where the reading-direction image is arranged in the combined image data and a size of the reading-direction image in the combined image data based on a reading resolution in the reading of the image from the sheet by the scanner and a recording resolution of the image data recorded in the storage unit.

2. The image processing apparatus according to claim 1, wherein the reading-direction image indicates the reading direction with text.

3. The image processing apparatus according to claim 2, wherein the reading-direction image includes directional characters pointing to a first read edge of the sheet in the image.

4. The image processing apparatus according to claim 1, wherein the reading-direction image includes directional characters pointing to a first read edge of the sheet in the image.

5. The image processing apparatus according to claim 1, further comprising:
a printer configured to form images on sheets, wherein the control unit is further configured to:
   combine an image-forming-direction image indicating an image forming direction of the printer with the generated image data.

6. The image processing apparatus according to claim 5, wherein the image-forming-direction image indicates the image forming direction of the printer with text.

7. The image processing apparatus according to claim 5, wherein the reading-direction image and the image-forming-direction image contain different text.

8. An image forming apparatus, comprising:
   a storage unit;
   a printer configured to form images on sheets;
   a scanner configured to:
      read an image from a sheet,
      generate image data by the reading of the image from the sheet, and
      store the image data in the storage unit; and
   a control unit configured to:
      combine a reading-direction image indicating a reading direction of the image from sheet by the scanner with the generated image data from the scanner to produce combined image data including the reading-direction image and the image data, and
      store the combined image data in the storage unit, wherein
   the control unit is configured to set a position where the reading-direction image is arranged in the combined image data and a size of the reading-direction image in the combined image data based on a reading resolution in the reading of the image from the sheet by the scanner and a recording resolution of the image data recorded in the storage unit.

9. The image forming apparatus according to claim 8, wherein the reading-direction image indicates the reading direction with text.

10. The image forming apparatus according to claim 9, wherein the reading-direction image includes directional characters pointing to a first read edge of the sheet in the image.

11. The image forming apparatus according to claim 8, wherein the reading-direction image includes directional characters pointing to a first read edge of the sheet in the image.

12. The image forming apparatus according to claim 8, wherein the control unit is further configured to:
   combine an image-forming-direction image indicating an image forming direction of the printer with the generated image data.

13. The image forming apparatus according to claim 12, wherein the image-forming-direction image indicates the image forming direction of the printer with text.

14. The image forming apparatus according to claim 12, wherein the reading-direction image and the image-forming-direction image contain different text.

15. A multi-functional peripheral apparatus, comprising:
   a storage unit;
   a printer configured to form images on sheets;
   a scanner configured to:
      read an image from a sheet placed on a document platen or fed by an auto-document feeder,
      generate image data by the reading of the image from the sheet, and
      store the image data in the storage unit; and
   a control unit configured to:
      combine a reading-direction image indicating a reading direction of the image from sheet by the scanner with the generated image data from the scanner to produce combined image data including the reading-direction image and the image data, and
      store the combined image data in the storage unit, wherein
   the control unit is configured to set a position where the reading-direction image is arranged in the combined image data and a size of the reading-direction image in the combined image data based on a reading resolution in the reading of the image from the sheet by the scanner and a recording resolution of the image data recorded in the storage unit.

16. The multi-functional peripheral apparatus according to claim 15, wherein the reading-direction image indicates the reading direction with text.

17. The multi-functional peripheral apparatus according to claim 16, wherein the reading-direction image includes directional characters pointing to a first read edge of the sheet in the image.

18. The multi-functional peripheral apparatus according to claim 15, wherein the control unit is further configured to:
   combine an image-forming-direction image indicating an image forming direction of the printer with the generated image data.

19. The multi-functional peripheral apparatus according to claim 18, wherein the image-forming-direction image indicates the image forming direction of the printer with text.

20. The multi-functional peripheral apparatus according to claim 19, wherein the reading-direction image and the image-forming-direction image contain different text.

* * * * *